US008819907B2

(12) United States Patent
Tomchick

(10) Patent No.: US 8,819,907 B2
(45) Date of Patent: Sep. 2, 2014

(54) SYSTEM FOR LOADING COLLARS ONTO BOLTS IN LARGE-SCALE MANUFACTURING OPERATIONS

(71) Applicant: Scott C. Tomchick, Edmonds, WA (US)

(72) Inventor: Scott C. Tomchick, Edmonds, WA (US)

(73) Assignee: Electroimpact, Inc., Mukilteo, WA (US)

( * ) Notice: Subject to any disclaimer, the term of this patent is extended or adjusted under 35 U.S.C. 154(b) by 0 days.

(21) Appl. No.: 13/911,943

(22) Filed: Jun. 6, 2013

(65) Prior Publication Data

US 2013/0263415 A1    Oct. 10, 2013

Related U.S. Application Data

(62) Division of application No. 11/934,694, filed on Nov. 2, 2007, now Pat. No. 8,468,671.

(51) Int. Cl.
*B23P 11/00* (2006.01)

(52) U.S. Cl.
USPC .................................. 29/243.53; 29/243.517

(58) Field of Classification Search
USPC .................................. 29/243.5; 221/278, 297
See application file for complete search history.

(56) References Cited

U.S. PATENT DOCUMENTS

| | | | |
|---|---|---|---|
| 5,280,673 | A | 1/1994 | Zieve et al. |
| 5,339,598 | A | 8/1994 | Rink et al. |
| 5,372,291 | A | 12/1994 | Vogeli et al. |
| 5,437,094 | A | 8/1995 | Zieve et al. |
| 5,472,087 | A | 12/1995 | Rink et al. |
| 5,697,521 | A | 12/1997 | Dixon |
| 6,253,448 | B1 | 7/2001 | Zieve et al. |
| 6,446,330 | B2 | 9/2002 | Zieve et al. |
| 6,550,118 | B2 | 4/2003 | Smith et al. |
| 7,805,829 | B2 | 10/2010 | Herrmann et al. |
| 7,954,218 | B2 | 6/2011 | Tomchick et al. |
| 2001/0045006 | A1 | 11/2001 | Zieve et al. |
| 2007/0157453 | A1 | 7/2007 | Tomchick et al. |
| 2009/0127279 | A1 | 5/2009 | Zieve et al. |
| 2009/0260413 | A1 | 10/2009 | Tomchick |
| 2011/0113623 | A1 | 5/2011 | Tomchick |

*Primary Examiner* — Lee D Wilson
*Assistant Examiner* — Jamal Daniel
(74) *Attorney, Agent, or Firm* — Jensen & Puntigam, PS

(57) ABSTRACT

The system includes a moving feed assembly, including a feed channel, through which a collar is moved by compressed air to a position in substantial alignment with the centerline of a swaging die tool. There is sufficient clearance between the collar and the channel to permit movement of the collar as a forward end of a die pin portion of the swaging die tool moves and engages a center opening of the collar.

3 Claims, 11 Drawing Sheets

SYSTEM FOR LOADING COLLARS ONTO BOLTS IN LARGE-SCALE MANUFACTURING OPERATIONS

PRIOR APPLICATION

This is a division of U.S. patent application Ser. No. 11/934,694, filed on Nov. 2, 2007.

TECHNICAL FIELD

This invention relates generally to assembly systems for large-scale manufacturing operations, such as for fastening together parts of aircraft wings or similar operations, and more specifically concerns a bolt collar transfer system for moving bolt collars into an aligned position with a swaging die tool assembly which then moves the collar to the parts. The collar is then swaged on a bolt extending through the parts.

BACKGROUND OF THE INVENTION

Systems for performing fastening operations involving bolts and collars which are swaged on the bolts in the manufacture of large workpiece assemblies such as commercial aircraft wings are known. An example of such a system is shown in U.S. Pat. No. 5,437,094, owned by the assignee of the present invention. Such systems typically involve a tool assembly which moves along the workpiece under computer control, performing fastening operations at successive locations. A drilling tool is used to first drill a hole in the workpieces to be joined, such as a wing panel and stringer, which are typically referred to as a stackup. A die and ram assembly is used for moving a collar into position adjacent the opening, and a bolt is then positioned and moved through the opening into the collar, or alternatively, the collar is moved onto a bolt extending through the opening. The ram assembly is then operated to swage the collar onto the end tail of the bolt, completing the fastening operation. The tool assembly is then moved to the next location along the stackup.

An important part of such a system is the movement of successive collars from a storage unit, such as a bin or cartridge, to the exposed end (tail) of the bolt. In one well-known commercial system, used in many aircraft manufacturing operations, successive collars are delivered through a feed tube. In this system, the collar center opening is perpendicular to the length of the feed tube as it moves along the feed tube. The collar is fed to a gripper system, which can include spring steel fingers or other gripping arrangements. The gripper system holds the exterior surface of the collar, and transfers the collar into a position where a die pin portion of the tool assembly can engage it. The fingers or other gripper elements are opened initially to permit transfer of the collar to the gripping elements and then opened again by stripping the gripping elements away from the collar to release the collar following engagement of the die pin with the collar.

The tight clearance between the die pin and the internal diameter (ID) of the collar often results in problems in the collar transfer operation. Transfer of the collar from the feed tube to the finger assembly can result in the collar being gripped by the gripper fingers off-axis, cocked in the gripper fingers, or otherwise misaligned, preventing a good, accurate loading of the collar onto the die pin. Such misaligned collars result in loss of operation time, difficulties in swaging and poor fastening operations. Detection and removal of such misaligned collars is time consuming, expensive and requires cleanup. An accurate and reliable collar feed system for transferring the collar to the die pin axis is an important consideration in manufacturing operations involving the fastening of bolts and collars. This problem is overcome by the present system in which the collar, in particular the collar axis, is permitted a certain amount of freedom of movement relative to the die pin axis during the transfer operation.

The tight clearance between the collar ID and the bolt often results in further problems as the collar is transferred onto the bolt. Transfer of the collar from the die pin to the bolt tail can result in the collar becoming cocked on the bolt or otherwise misaligned. Misaligned collars on the bolt also result in loss of operation time, difficulties in swaging and poor fastening operations. An accurate and reliable collar alignment system with the bolt is thus important. This result is achieved in the present system by accurate, controlled movement of the collar, the die and the die pin axis relative to the extending bolt axis.

Hence, a system by which a collar can be accurately and reliably delivered onto a bolt for swaging during manufacture of large-scale mechanical assemblies, maintaining correct feed and alignment between the bolt, the collar and the moving die pin would be advantageous over existing commercial collar gripping/transfer systems. The system disclosed herein has those advantages.

SUMMARY OF THE INVENTION

Accordingly, one aspect of the invention disclosed herein is a gripperless system for conveying collars having a center opening to a position where an axis of the center opening of the collar is alignable with a centerline axis of a swaging die tool for bolts, the swaging die tool being part of a tool assembly for manufacturing operations, which comprises a collar feed assembly, including a feed channel therein through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the forward end of the die pin portion is tapered, the forward end of the taper being larger than half the side-to-side clearance between the collar and the channel.

Another aspect is gripperless system for conveying collars having a center opening to a position where an axis of the center opening of the collar is alignable with a centerline axis of a swaging die tool for bolts, the swaging die tool being part of a tool assembly for manufacturing operations, which comprises a collar feed assembly, including a feed channel therein through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the forward end of the die pin portion is radiused, a forward end of the radius being larger than half the side-to-side clearance between the collar and channel.

A further aspect is a gripperless system for conveying collars having a center opening to a position where an axis of the center opening of the collar is alignable with a centerline axis of a swaging die tool for bolts, the swaging die tool being part of a tool assembly for manufacturing operations, which comprises a collar feed assembly, including a feed channel therein through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the die tool or a portion thereof is compliant mounted so that it can move slightly to permit reliable engagement of the bolt and the collar.

BEST MODE FOR CARRYING OUT THE INVENTION

Figure 1:
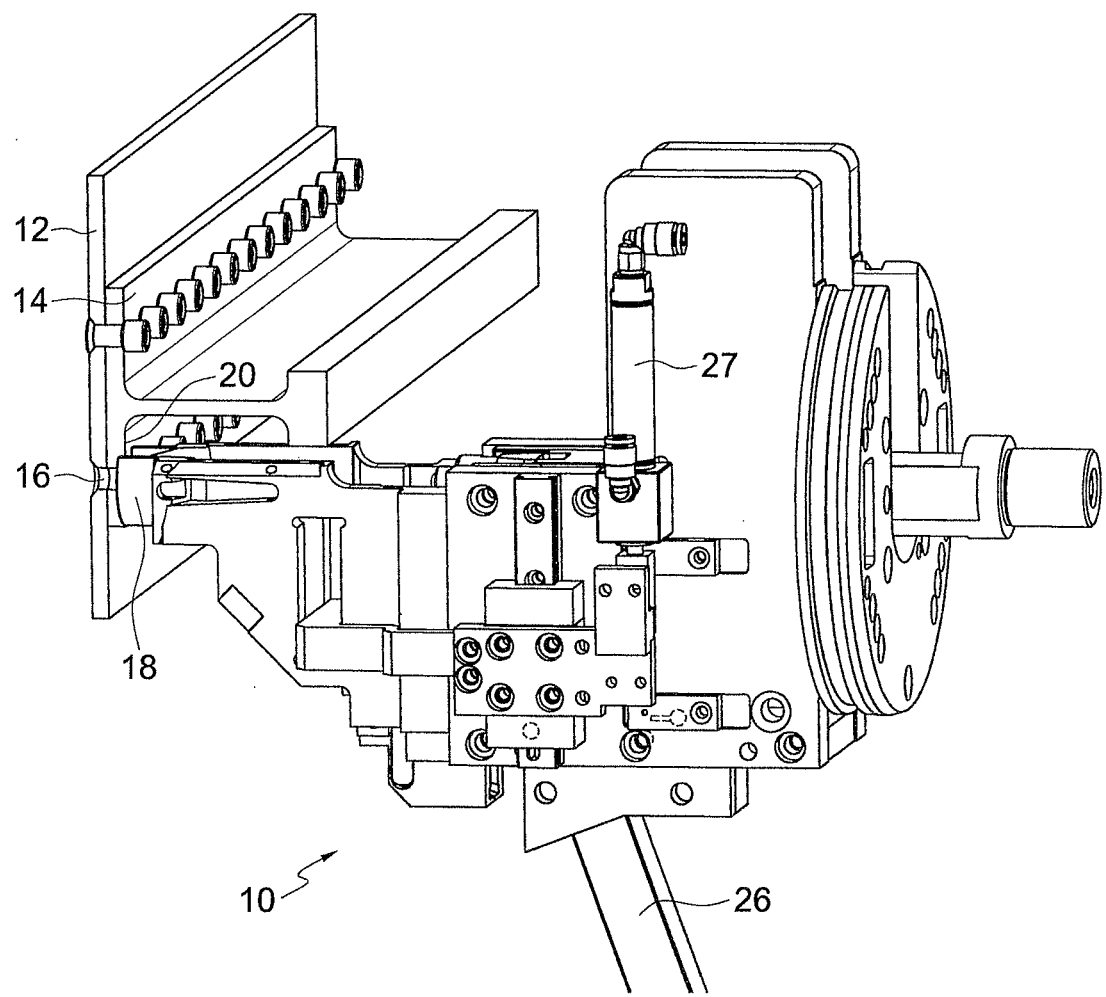
FIG. 1 is a perspective view of a bolt/collar fastening system, shown in a "clamp-up" position relative to a stackup.

FIG. 1 shows a portion 10 of a tool assembly for fastening two workpiece parts, referred to as a stackup, together by means of a through-bolt and a collar swaged onto a tail end of the bolt, which is moved through an opening in the stackup into the collar prior to swaging. In the embodiment shown, the stackup is a portion of an aircraft wing, e.g. a panel 12 and a stringer 14. Such a combination, however, is for illustration and is only one example of two or more workpiece combinations which can be fastened using the bolt and collar fastener assembly system shown and described herein.

FIG. 1 shows an opening 16 in the stackup which has been already drilled by a drilling tool (not shown) portion of the tool assembly, the drilling tool being located on the opposite side of the stackup from tool assembly portion 10. FIG. 1 shows tool assembly portion 10 in a "clamped up" position, with a clamping foot 18 positioned against one surface 20 of stringer 14.

Figure 2:
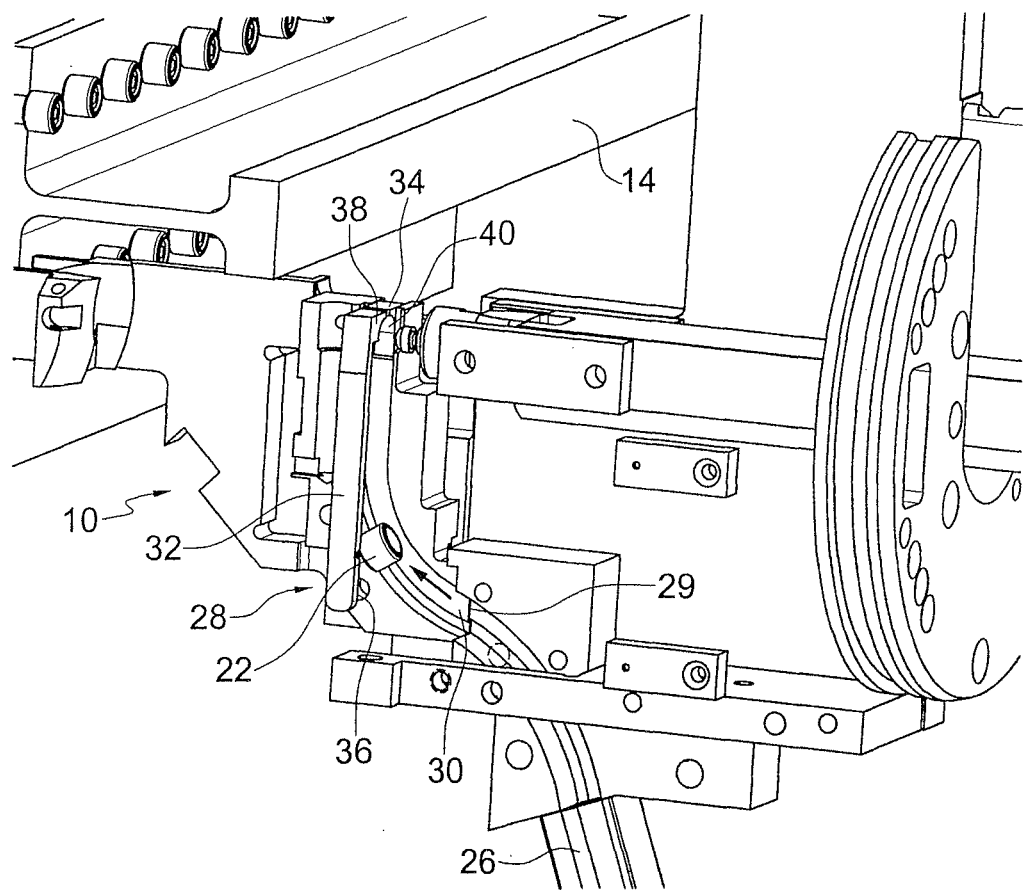
FIG. 2 is a partially cutaway view showing movement of a collar within a moving feed assembly.

FIG. 2 shows the movement of an annular collar 22 from a flexible feed tube 26 which originates at a collar container (not shown), such as a bin or a cartridge. Collar 22 is moved in the embodiment shown by compressed air from the collar container through flexible feed tube 26 into a moving feed assembly 28. The moving feed assembly 28 includes a curved channel 30 therein along which the collar is moved from end 29 of the feed tube 26.

Figure 3:
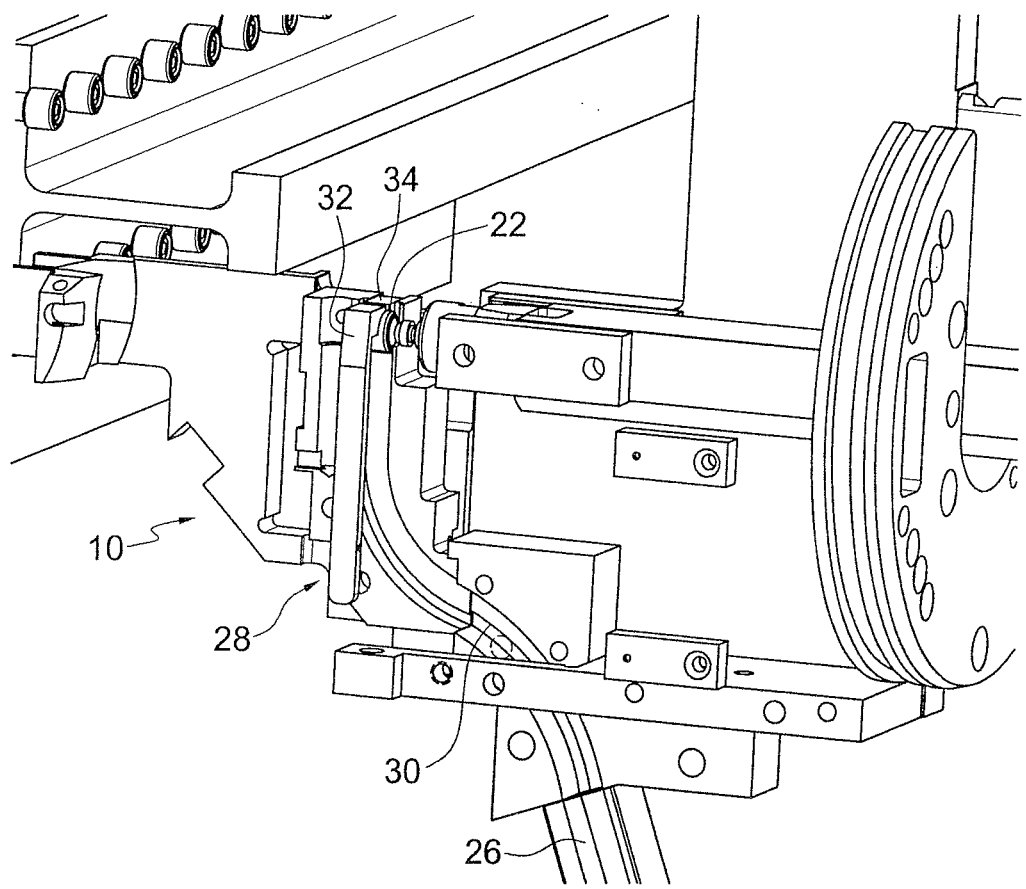
FIG. 3 is a partially cutaway view showing a collar moved into position on the die tool centerline.

Flexible feed tube 26 is rectangular in internal cross-section, as is curved channel 30. The collar 22 is oriented in feed tube 26 and in channel 30 such that the axis of the collar's center opening, at the end portion of the channel, is at 90° to the surface of part 14, and at 90° to the opening (length) of the feed tube, i.e. off axis to the movement of the tool assembly portion 10, as discussed in detail below, and as shown in FIGS. 2 and 3. The size and rectangular configuration of the internal opening of the feed tube 26 and the channel 30 maintains the orientation of the collar as it is moved thereal-ong by compressed air. Both the feed tube and the channel are somewhat larger than the collar, i.e. there is significant clearance for the collar between the collar and the walls of the flexible feed tube and the channel 30, but the clearance does not permit the collar to tumble therein about it transverse axis.

The moving feed assembly is arranged to have two operational positions. In the embodiment shown, the feed assembly is mounted to slide between the two positions. One position is shown in FIG. 2 and is referred to as a first or raised position. The moving feed assembly in the embodiment shown includes two elongated identical fingers 32 and 34 mounted on opposite sides of a body portion 35 of the feed path assembly. Fingers 32 and 34 in this embodiment are spring-loaded by finger springs 36 at the lower end thereof, which are connected to body portion 35 and in operation pivot about a finger pivot member 37, which is shown in FIG. 4.

Fingers 32 and 34 extend upwardly to approximately the top of the moving feed assembly, terminating in curved portions 38 and 40, respectively, which in operation are contacted by collar 22 at the end of its movement. The curved portions 38 and 40 have a combined configuration which is similar to a portion of the exterior surface of collar 22 and therefore can receive the collar thereagainst. Fingers 32 and 34 are arranged such that channel 30 terminates approximately at curved portions 38 and 40.

The compressed air action is sufficient alone to force collar 22 through feed tube 26 and channel 30 and into an operative position against the curved portions 38, 40 of fingers 32 and 34. The spring action (finger springs 30) of fingers 32 and 34 is sufficiently strong that collar 22 can be pressed firmly against the curved portions of the fingers by the compressed air without allowing collar 22 to pass between them. The fingers thus act as a stop assembly for the collar, as the collar is moved into position in approximate initial alignment with the centerline of the tool assembly portion 10. The feed assembly is positioned such that the collar is conveyed along a path which is off axis or 90° (perpendicular) relative to the axis of the tool assembly portion 10 during the last part of the collar's travel.

Figure 4:
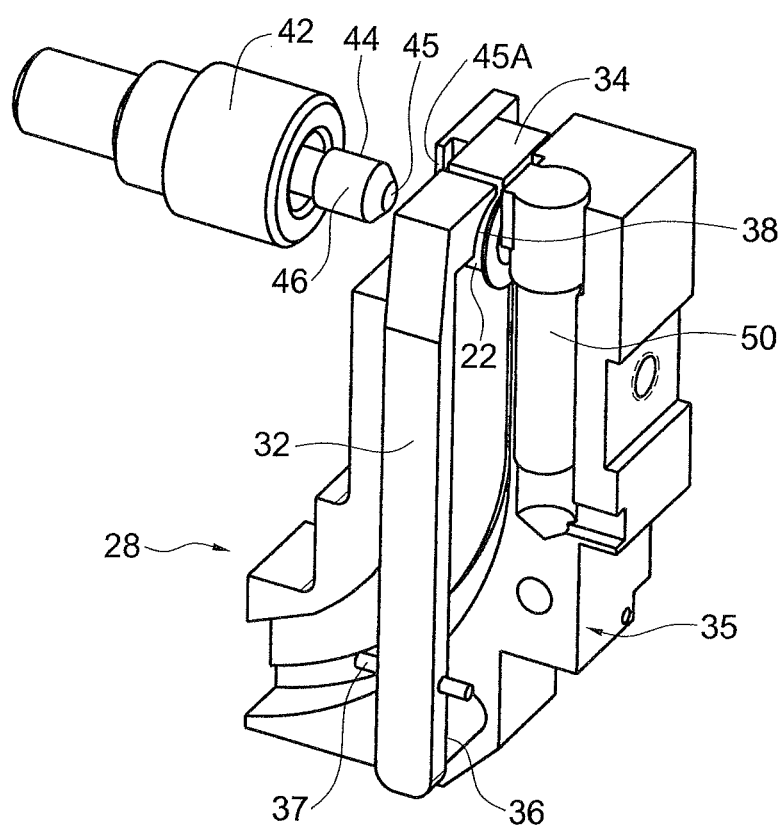
FIG. 4 is a partially cutaway view also showing a collar on the die tool centerline, with a die pin portion thereof ready to be moved into the collar.

The collar is oriented in the flexible feed tube 26 and the channel 30 such that when it reaches the end of its travel, it is pressed against curved portions 38, 40 of the fingers by the compressed air action and is generally aligned with the centerline of the tool assembly portion 10, including swaging die 42 and an extending die pin 44, as shown in FIG. 4. The compressed air action must be controlled and sufficient to securely and accurately maintain the collar against the curved portions of the fingers, which, as indicated above, resist being opened, so that the collar axis is located within a certain clearance relative to the axis of the ram portion of the tool. More specifically, although the collar is held generally in position by the pneumatic pressure of the compressed air, it is free to "float" 0.5 mm side-to-side. Up/down movement is actually unrestrained, but the up/down position is maintained by the compressed air. Multiple collars in the feed tube or channel have no effect on the above-described operation of the system. Only the position of the last collar, the collar held against the fingers 32, 34, is important.

While fingers 32 and 34 are part of the embodiment shown, it should be understood that many other arrangements can be used to act as a stop for the collar as it reaches the end of the feed path. One finger can be used, or more than two fingers, or a spring or even rubber stop members. The stop and the four interior surfaces of the channel 30 act as a confining structure or cavity to maintain the collar in an approximately proper orientation and position relative to the die pin 44, not allowing the collar to tilt or tumble within the cavity.

In the embodiment shown, the side of the channel 30 adjacent the forward end 45 of die pin 44 has a slot (one edge of which is shown at 45A) which allows the die pin 44 to enter channel 30. The slot has a size such that die pin 44, upon entering the slot, is physically centered relative to channel 30 and is rigidly constrained from side-to-side movement. Die pin 44 has an exterior surface 46 of approximately the same diameter as the interior diameter of collar 22, with a chamfered portion 47 at the forward end thereof. An O-ring (not shown) may be positioned on the extending die pin 44 to help the die pin stick to the collar when the die pin is moved into the collar.

In another approach, the die pin is segmented, composed of multiple spring loaded members to retain the collar on the die pin. A sensor 50 is positioned in the moving feed assembly to detect the presence of a collar at the pick up position of the collar, when the collar is in position against the curved portion of the fingers. At a selected time following detection of collar 22, swaging die 42 and the extending die pin 44 are moved forwardly, with die pin 44 engaging first slot 45A in channel 30 and then the center opening of collar 22. An important aspect of this arrangement is that the collar is not held rigidly within the cavity formed by the channel walls and the curved portions of the fingers, but rather, it is able to float to some extent in the cavity. Accordingly, when the die pin 44 is advanced, the collar readily orients itself by sliding along the chamfer on the die pin as the die pin moves into the collar, until the collar is fully engaged with the die pin. The die pin thus accurately engages and sticks to the collar.

Figure 5:
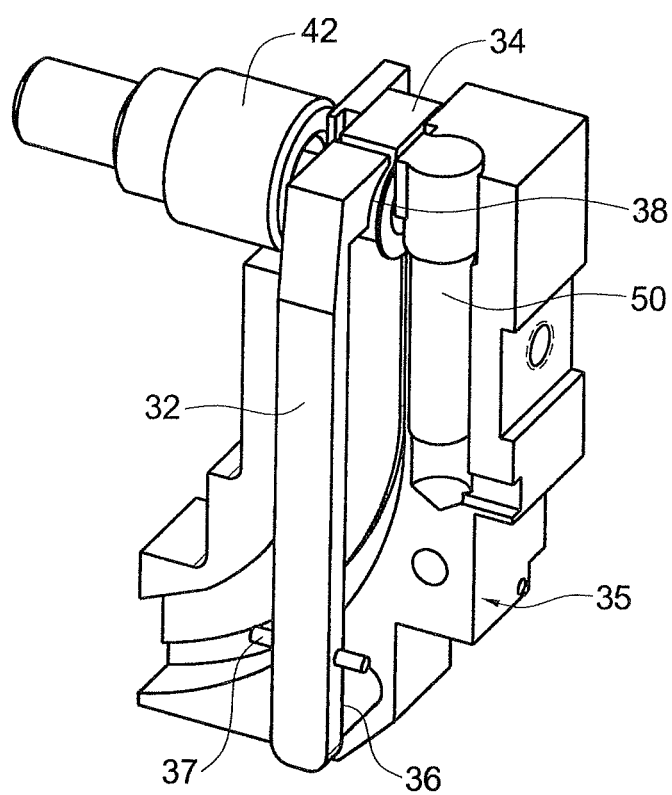
FIG. 5 is a partially cutaway view showing the die pin fully inserted into the collar.

The collar thus need not be initially absolutely accurately aligned in the channel for a good loading (transfer) to occur. The chamfer 47 aids in the transfer operation. It is desirable that the size of the chamfer (the diameter of the die pin at the forward end thereof) be greater than one-half the side-to-side clearance between the collar and the channel walls for the transfer to be reliably completed. The angle of the chamfer can vary depending on the desired length of the die pin. FIG. 5 shows the die pin fully inserted into the collar.

While the collar is prevented from tumbling by the rectangular cross-section of the cavity and is held against the fingers by the action of the compressed air, there is enough room, as explained above, between the cavity interior surfaces and the stop assembly to allow the collar to adjust its position slightly to align itself with the die pin 44 as it moves into the collar. This allows the collar to maintain its proper position relative to the tool assembly. The die pin/swaging die combination has a fixed (extremely stiff) radial alignment between them. Their cylindrical axes are fixed, although the die pin can, as indicated above, slide longitudinally along the cylindrical axis of the swaging die/die pin. The two cylindrical axes always remain aligned during operation.

When the collar is loaded onto the die pin by the feed tube/channel/cavity/compressed air arrangement described above, the following actions and interactions between the channel, the die pin/swaging die and the collar exist to prevent collar damage and ensure successful collar loading. The die (swaging die 42) and die pin 44 are free to move transversely (radially) as the die pin first moves into and centers itself relative to the slot 45A in the rigidly mounted channel. The 0.5-1 mm side-by-side clearance between the cavity walls and the collar allows the collar to be positioned loosely within the cavity. The loose positioning allows the collar to move somewhat within the cavity, but not tip, to accommodate the die pin as the die pin is inserted into the collar. The chamfer 47 on the forward end of the die pin is sufficiently large to provide a sliding surface to facilitate movement of the collar into alignment with the die pin. Chamfer 47 is shown as a straight chamfer but it could also be curved (radiused). The order of compliance for the elements involved in the collar loading function onto the die pin, from least compliant to most compliant, is the channel, the die pin/die combination and the collar.

Figure 6:
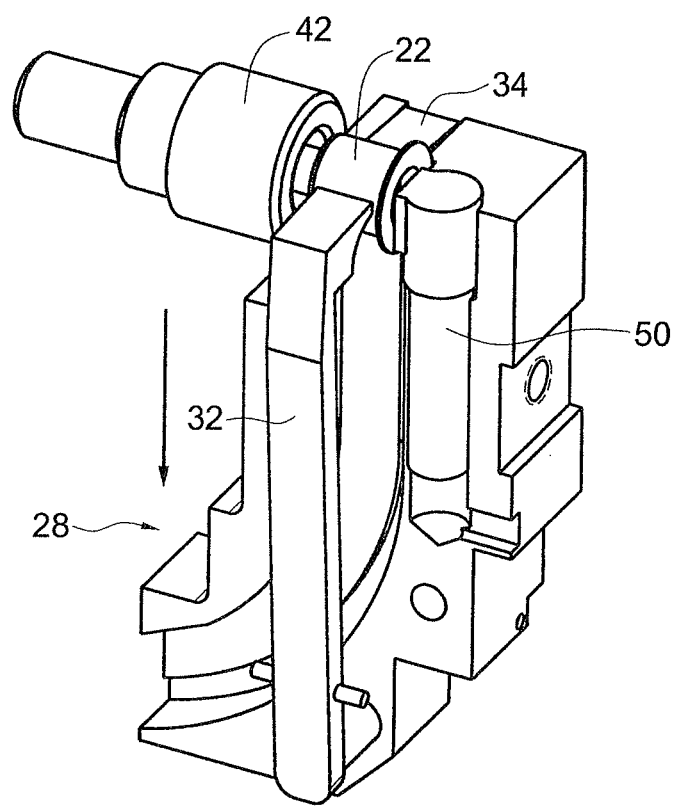
FIG. 6 is a partially cutaway view showing spring-loaded fingers of the moving feed assembly having moved away from the collar.
Figure 7:
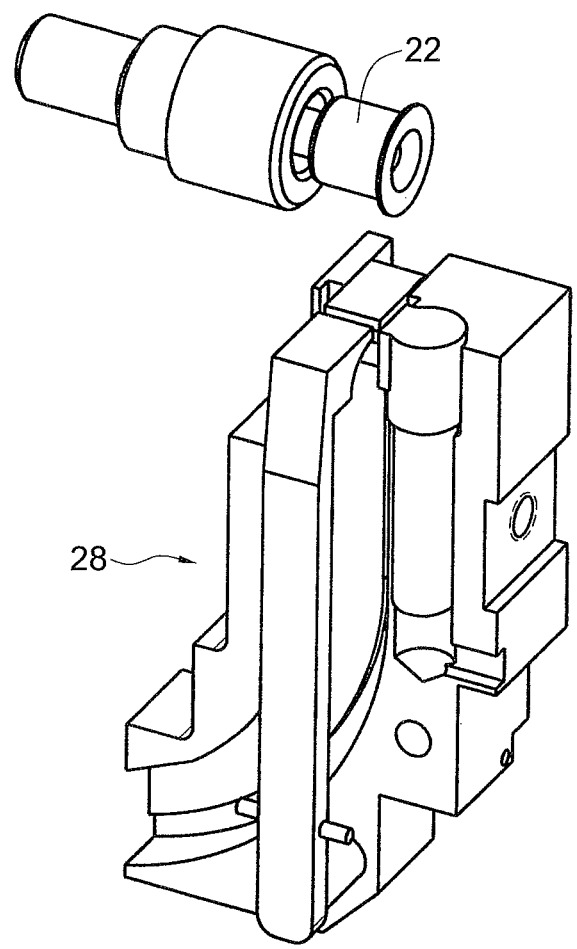
FIG. 7 is a partially cutaway view showing the position of the moving feed assembly in a second position completely removed from the die-engaged collar.
Figure 8:
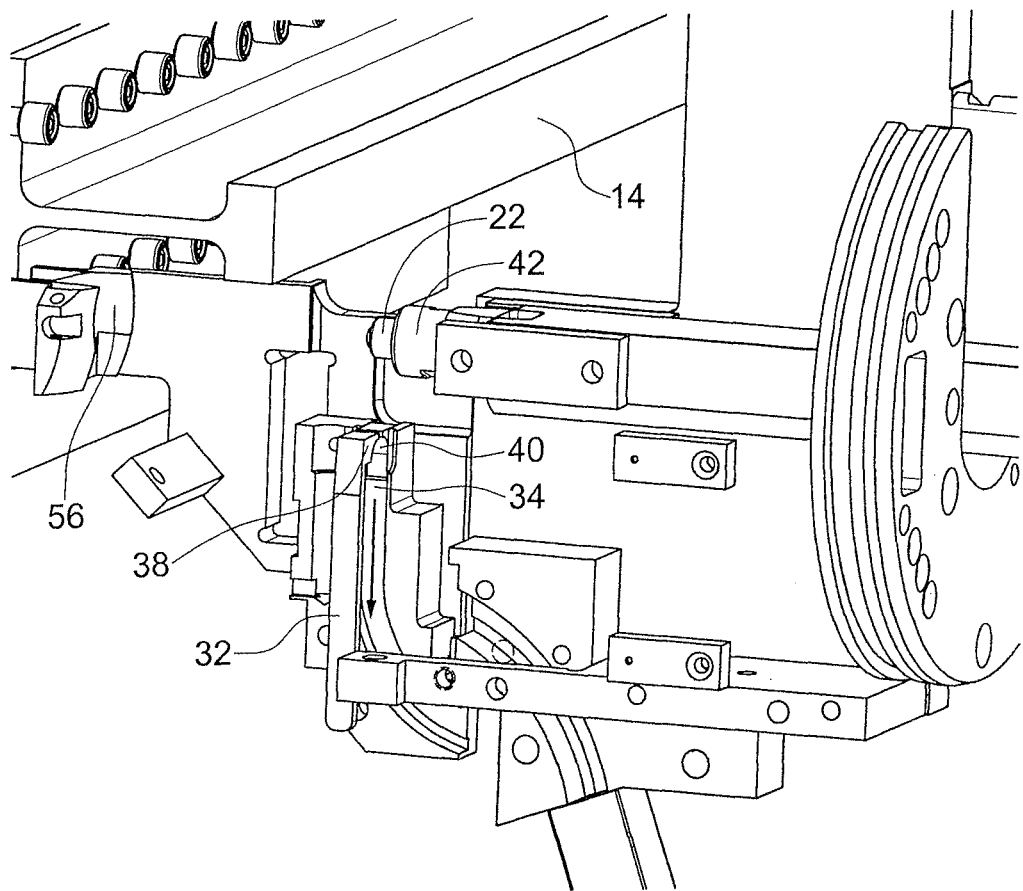
FIG. 8 is a perspective view showing the collar ready to be moved into position against the opening for the bolt in the stackup.

At this point, referring now to FIGS. 6 and 7, the feed assembly 28, including fingers 32, 34, is moved to a second position, sliding downwardly and away from the collar, which is held in place by die pin 44, the fingers 32, 34 being stripped away from the collar as the feed assembly 28 slides. The downward movement is strong enough to force the spring-loaded fingers away from each other, from about collar 22, which is securely mounted on die pin 44. The entire feed assembly, or at least the portion thereof containing fingers 32 and 34 and sensor 50, moves out of the way of collar 22 and tool assembly portion 10. The second position of the feed assembly, following the downward movement thereof, is shown in FIGS. 7 and 8.

Figure 9:
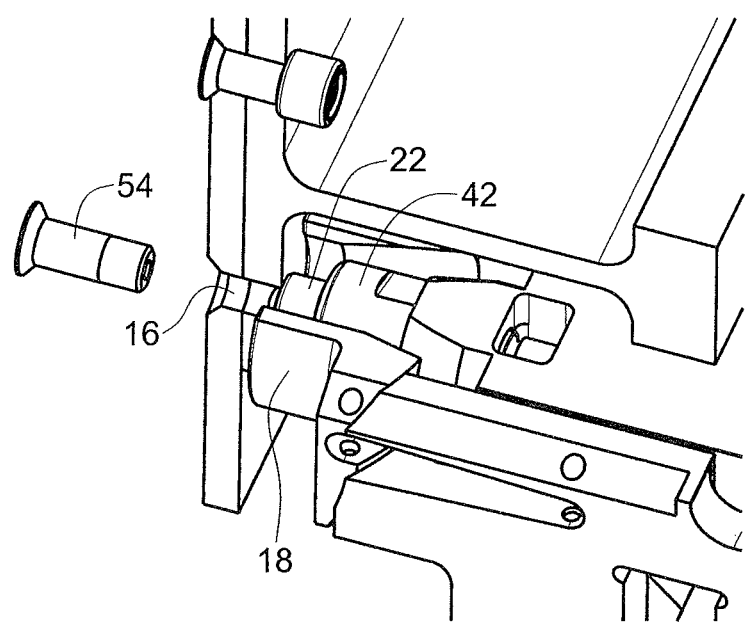
FIG. 9 is a partially cutaway view showing the collar against the stackup ready to be engaged by the tail pin of a bolt.

A ram portion of tool assembly 10 then moves swaging die 42 and the die pin 44 with the collar 22 engaged thereon forwardly along the tool axis toward the stackup. The collar is ultimately positioned in one embodiment by the ram action adjacent the near surface of the stackup, with the center opening of the collar being in registry with opening 16 in the panel and stringer, as shown in FIG. 9. In this position, the orientation and position of the collar 22 is verified by a sensor (not shown) that indirectly measures the position of the swaging ram. A bolt 54 is then inserted through opening 16 and into the collar, forcing die pin 44 back into die 42. Alternatively, the collar can be moved onto a bolt which is already extending through the stackup.

At this point, the ram moves the die 42 forwardly to swage collar 22 onto the tail of bolt 54, completing the fastening operation. Die 42 is then retracted with die pin 44, leaving the successfully installed fastener combination in place. The entire tool assembly portion 10 is then retracted and moved to the next position along the workpiece, to repeat the above operation, after the feed assembly has been moved back to its first position.

The actions and interactions between the bolt, the die pin/die combination and the collar must be as follows to insure proper transfer of the collar from the die pin to the bolt prior to swaging. The bolt is extended through or has been extended through the hole in the stackup, and the collar and die pin/die combination must align with the axis of the bolt for successful transfer to occur. The die pin/die axis moves transversely (radially) to align with the bolt axis as the collar and the tail end of the bolt initially engage. The die pin/die combination is mounted loosely to the ram to permit this transverse movement. The force to align these axes is produced by the physical engagement of the collar and the bolt. In this transfer action, the least compliant (stiffest) element is the bolt, then the collar, followed by the die/die pin combination, i.e. the die pin/die combination is the freest to move.

It is important to note that the relative compliance of the die pin/die combination and the collar reverses between the loading action of the collar onto the die pin and the transfer action of the collar onto the tail of the bolt. This change in relative compliance occurs when the collar is loaded on the die pin, the collar's rigidity being in effect significantly increased thereby, so that as the collar thereafter interacts with the tail end of the bolt, the die pin/die is forced to move radially to align the die's center axis with the bolt's center axis, insuring successful transfer of the collar onto the tail of the bolt. During previous loading of the collar on the die pin, it is the collar which can move relative to the die pin/die combination to align the axis of the collar with the axis of the die pin/die.

Hence, a system has been described which reliably moves bolt collars along a path which is at 90° relative to the centerline of a tool assembly portion 10 and stops the collar in a position in which the axis of the opening of the collar is at that point approximately on the center axis of the tool portion. Following loading of the collar onto the die pin, the collar is then transferred onto the tail of the bolt, followed by swaging of the collar.

Figure 10:
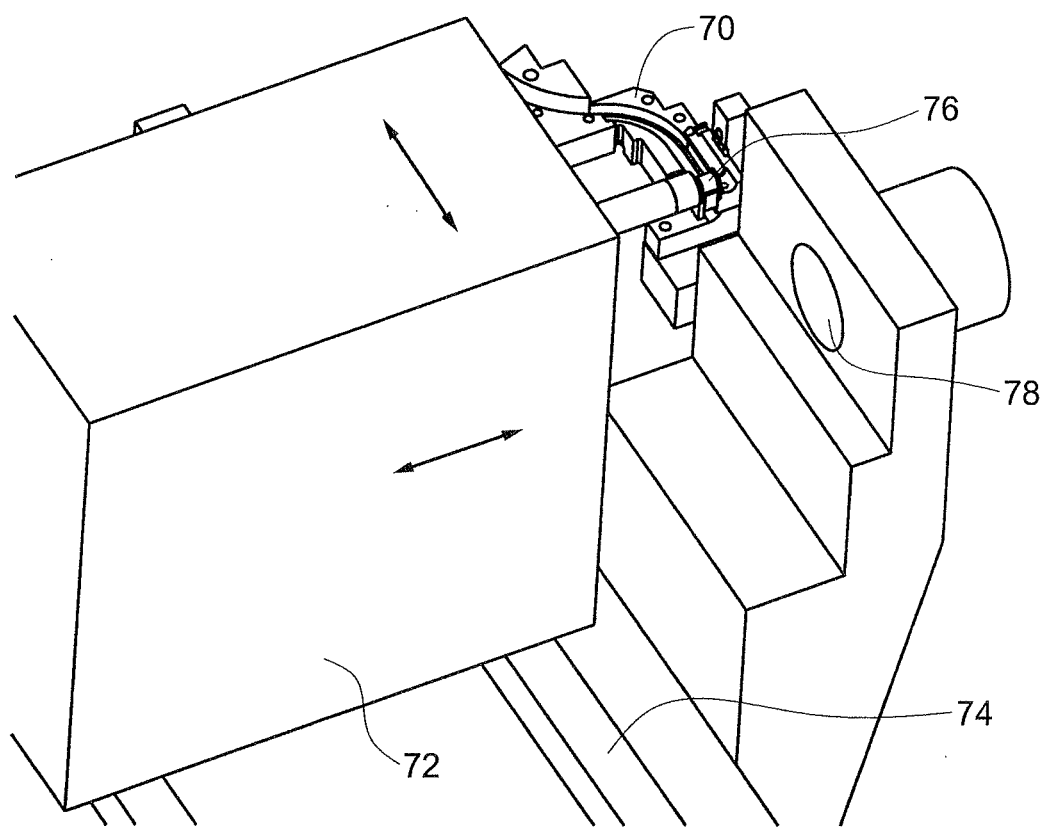
FIGS. 10 and 11 are perspective views of an alternative embodiment in which the feed assembly is fixed and the die tool assembly with the collar moves away from the feed assembly to permit the die tool to move the collar toward the stackup.
Figure 11:
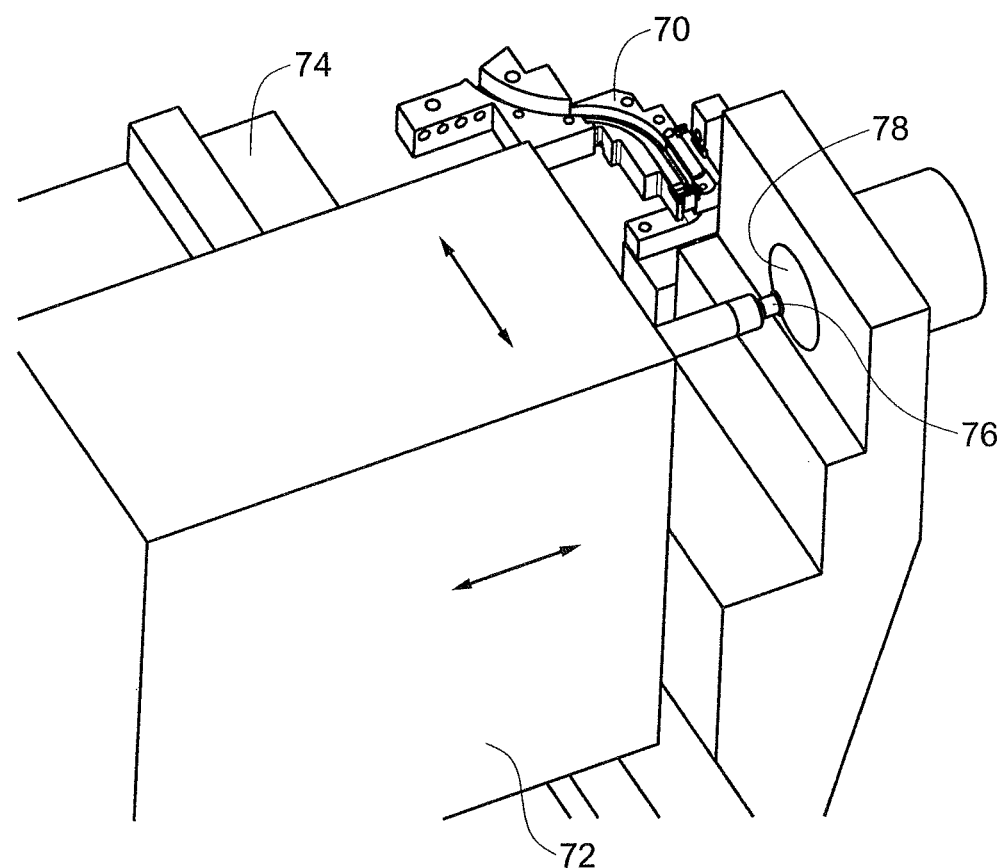

In the embodiment shown, during the collar loading operation, the feed assembly is moved between two positions, while the tool remains fixed, other than its translational movement toward and away from the stackup. It should be understood, however, that the feed assembly could be fixed while the tool could move, such as on a laterally moving shuttle, in addition to its translational movement, to move the engaged collar to a position away from the feed assembly where it can be moved to the workpiece. This is shown in FIG. 10 which shows a fixed feed assembly 70 for moving collars from a storage bin and a tool assembly 72 which moves transversely on a shuttle 74 to first obtain and load a collar 76 onto the die pin from the feed assembly and then to a position away from the feed assembly where the die pin/die combination is moved toward the stackup with opening 78, to transfer the collar onto an extending bolt (not shown).

Although a preferred embodiment of the invention has been disclosed here for the purposes of illustration, it should be understood that various changes, modifications and substitutions may be incorporated in the embodiment without departing from the spirit of the invention, which is defined by the claims which follow.

What is claimed is:

1. A gripperless system for conveying collars having a center opening to a position where an axis of the center opening of the collar is alignable with a centerline axis of a swaging die tool for swaging conveyed collars onto bolts, in combination with the swaging die tool, the swaging die tool being part of a tool assembly for manufacturing operations, the combination comprising:
   a swaging die tool; and
   a collar feed assembly, including a feed channel through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the forward end of the die pin portion is tapered, the forward end of the taper being larger than half the side-to-side clearance between the collar and the channel.

2. A gripperless system for conveying collars having a center opening to a position where an axis of the center opening of the collar is alignable with a centerline axis of a swaging die tool for swaging conveyed collars onto bolts, in combination with the swaging die tool the swaging die tool being part of a tool assembly for manufacturing operations, the combination comprising:
   a swaging die tool; and
   a collar feed assembly, including a feed channel through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the forward end of the die pin portion is radiused, a forward end of the radius being larger than half the side-to-side clearance between the collar and channel.

3. A gripperless system for conveying collars having a center opening to a position where an axis of the center opening of the collar is alignable with a centerline axis of a swaging die tool for swaging conveyed collars onto bolts, in combination with the swaging die tool, the swaging die tool being part of a tool assembly for manufacturing operations, the combination comprising:
   a swaging die tool; and
   a collar feed assembly, including a feed channel through which a collar is conveyed by compressed air, the feed channel being generally perpendicular to the swaging die tool centerline axis as the feed channel approaches the swaging die tool, wherein the feed assembly includes a stop assembly for the collar, the collar being automatically operatively positioned, solely by action of the compressed air, relative to the swaging die tool centerline axis, and wherein there is sufficient clearance between the collar and the channel to permit movement of the collar as a forward end of a die pin portion of the die pin tool moves and engages the center opening of the collar, resulting in accurate automatic loading of the collar onto the die pin, wherein the feed assembly or the swaging die tool are movable sufficiently thereafter to permit a die pin-engaged collar to be moved forward for engagement with a tail end of a bolt, wherein the die tool or a portion thereof is compliant mounted so that it can move slightly to permit reliable engagement of the bolt and the collar.

* * * * *